(12) United States Patent
Kim et al.

(10) Patent No.: US 7,744,240 B2
(45) Date of Patent: Jun. 29, 2010

(54) BACKLIGHT UNIT AND METHOD FOR FABRICATING THE SAME

(75) Inventors: Kyoung Sub Kim, Gumi-si (KR); Eun Seok Jang, Gumi-si (KR); Dong Im Huo, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 533 days.

(21) Appl. No.: 11/639,304

(22) Filed: Dec. 15, 2006

(65) Prior Publication Data
US 2008/0012487 A1 Jan. 17, 2008

(30) Foreign Application Priority Data
Jun. 30, 2006 (KR) .................... 10-2006-0060527

(51) Int. Cl.
*F21S 4/00* (2006.01)
(52) U.S. Cl. .................. 362/225; 362/217.12; 313/234; 445/26
(58) Field of Classification Search ................. 313/422, 313/634, 607, 484–494, 514–515, 519, 633, 313/631, 483, 475, 473, 56, 169.4, 234, 581, 313/292, 238, 268, 582, 594; 445/26; 349/70–71, 349/64; 174/138 E, 138 G; 362/614, 97, 362/530, 532, 658, 223, 225, 217.1, 217.11–217.13
See application file for complete search history.

(56) References Cited

U.S. PATENT DOCUMENTS 7,465,062 B2 * 12/2008 Kwon .......................... 362/225
2003/0218877 A1 * 11/2003 Moon .......................... 362/225
2006/0104083 A1 * 5/2006 Kwon .......................... 362/559
2006/0146512 A1 * 7/2006 Choi ............................ 362/29
2006/0203480 A1 * 9/2006 Choi ........................... 362/225
2007/0030663 A1 * 2/2007 Ryu ............................. 362/29
2007/0035245 A1 * 2/2007 Bae et al. ..................... 313/581
2007/0176559 A1 * 8/2007 Lin et al. ..................... 313/607

FOREIGN PATENT DOCUMENTS

KR 10-2006-0071494 6/2006

* cited by examiner

*Primary Examiner*—Peter J Macchiarolo
*Assistant Examiner*—Donald L Raleigh
(74) *Attorney, Agent, or Firm*—McKenna Long & Aldridge LLP

(57) ABSTRACT

Disclosed is a backlight unit that is suitable for reducing humming noise that occurs when power is applied for dimming control. The present invention provides a backlight unit including a plurality of lamps arranged over a bottom cover, first and second lower structures respectively mounted at opposite ends of the lamps, the first and second lower structures having a groove between adjacent lamps, sound absorbing pads disposed within the grooves, common electrodes mounted on the first and second lower structures having the sound absorbing pads thereon respectively, and first and second upper structures respectively coupled to the first and second lower structures. The first and second upper structures have a plurality of ribs that press down on the common electrodes and sound absorbing pads.

17 Claims, 9 Drawing Sheets

BACKLIGHT UNIT AND METHOD FOR FABRICATING THE SAME

This application claims the benefit of the Patent Korean Application No. P2006-60527, filed on Jun. 30, 2006, which is hereby incorporated by reference as if fully set forth herein.

BACKGROUND OF THE INVENTION

1. Field of the Invention

The present invention relates to a backlight unit and method for fabricating the same for a display. More particularly, the present invention relates to a backlight unit suitable for reducing humming noise that takes place during dimming adjustment of the backlight unit having external electrode lamps.

2. Discussion of the Related Art

The CRT (Cathode Ray Tube) has traditionally served as the basis for televisions, monitors, information terminals, etc. However, CRTs have disadvantages with regard to, for example, size and weight.

Other display technologies have emerged, which address the size and weight problems associated with CRTs. Among these are Liquid Crystal Displays (LCD), which utilize an electro-optical effect; Plasma Display Panels (PDP), which utilize a gas discharge; and Electro Luminescent Displays (ELD), which utilize an electro luminescent effect. In particular, research in LCD technology has been progressing rapidly.

In efforts to replace CRTs, LCDs have been developed to have minimal physical dimensions, low weight, and low power consumption. As a result, LCDs are now used in applications such as laptop computers and desktop monitors. As performance has improved, LCDs have also become popular in large-scale information display applications.

Most liquid crystal display devices are light receptive devices that display a picture by adjusting the quantity of light received from outside the liquid crystal display device. As such, LCDs require a separate light source for directing the light to the LCD panel. This separate light source is referred to as a backlight unit.

Related art backlight units include an arrangement of cylindrical lamps. The cylindrical lamps are arranged in either edge type or direct type configurations.

The edge type backlight unit has a lamp unit mounted on an edge of a light plate which guides the light. The lamp unit is provided with a lamp for emitting the light, a lamp holder placed on both ends thereof for protecting the lamp, and a lamp reflective plate surrounding an outside surface of the lamp having one side placed on the edge of the light plate for reflecting the light from the lamp toward the light plate.

The edge type backlight unit, which has the lamp unit mounted on the edge of the light plate, is mostly applicable to laptop or desktop computer monitors, for which minimal physical dimensions are important. The edge type backlight unit has good light output, uniformly long lifetime, and can be very thin.

Direct type backlight units, originally developed for LCD displays greater than 20 inches, have a plurality of lamps arranged in parallel under a diffusion plate for directing the light toward a front surface of the LCD panel. Direct type backlight units have a better light utilization efficiency than edge type backlight units. As such, direct type backlight units are mainly used in large sized LCDs that require high luminance.

However, because LCDs having direct type backlight units, such as large sized monitors, TVs, or the like, have a longer time period of use and a greater number of lamps as compared to laptop computers, direct type backlight units have a higher rate of lamp failure than edge type backlights.

Moreover, in the case of the edge type backlight unit that has the lamp units mounted on opposite edges of the light plate, if one lamp fails, there will be drop in screen luminance, but otherwise there will be no significant problems. However, because the direct type has the plurality of lamps under the screen, if one lamp fails, the portion of the screen in front of the failed lamp will become significantly darker compared to the rest of the screen. As such, the portion where the lamp fails to turn on appears on the screen as a nonuniformity in luminance.

Due to this, because frequent replacement of the lamps is required for the direct type LCD, the direct type LCD is required to have a structure in which disassembly and assembly of the backlight unit is easy.

FIG. 1 illustrates a perspective view of a related art direct type backlight unit 100. Referring to FIG. 1, the related art backlight unit 100 is provided with a plurality of lamps 11 arranged over a bottom cover 15 at regular intervals each with external electrodes 10$a$, and 10$b$ at outside opposite ends of a tube, gripper type common electrodes 13 for fixedly securing the lamps 11 and applying a voltage to the electrodes 10$a$, and 10$b$ at the opposite ends of the lamps 11, and supporter side bottoms 14$a$, and 14$b$ arranged under the opposite ends of the lamps 11 in one direction for seating the common electrodes 13, respectively. Each of the common electrodes 13 is formed as a unit and arranged in one direction for applying the same voltage to the opposite ends of the plurality of lamps 11.

The lamps 11 each have external electrodes 10$a$, and 10$b$ at opposite ends of a tube for receiving the voltage through the common electrodes 13.

The backlight unit 100 with the external electrode lamps has a burst mode inverter applied thereto to enable dimming control to improve contrast ratio and vary luminance. The dimming control is done by repetitively turning on/off of the lamps at about 150~240 Hz frequency. However, the repetitive application of AC power to the common electrodes 13 at such a frequency causes vibration to occur not only at the lamps, but also at the common electrodes having the power applied to them.

In general, human beings can hear frequencies in the range of 20 Hz~20000 Hz. Accordingly, changing the dimming control by applying a voltage to the common electrodes causes a vibration in this frequency range, which human beings can hear as a humming noise.

SUMMARY OF THE INVENTION

Accordingly, the present invention is directed to a backlight unit that obviates one or more of the aforementioned problems due to the limitations of the related art.

Accordingly, one advantage of the present invention is that it reduces the humming noise experienced when a dimmer control voltage is applied to an LCD.

Additional advantages of the invention will be set forth in the description that follows, and in part will be apparent from the description, or may be learned by practice of the invention. The advantages of the invention will be realized and attained by the structure pointed out in the written description and claims hereof as well as the appended drawings.

To achieve these and other advantages and in accordance with the purpose of the invention, the present invention involves a backlight unit. The backlight unit comprises a plurality of lamps; a first lower structure mounted at a first end of the lamps, the first lower structure having a first plurality of grooves, wherein each of the first plurality of grooves are disposed between the lamps; a first plurality of sound absorbing pads, wherein each of the first plurality of sound absorbing pads is disposed in one of the first plurality of grooves; a first plurality of common electrodes coupled to the first lower structure having the first plurality of sound absorbing pads disposed between the first plurality common electrodes and the first lower structure; and a first upper structure coupled to the first lower structure, wherein the first upper structure has a first plurality of ribs.

In another aspect of the present invention, the aforementioned and other advantages are achieved by a backlight unit, which comprises a plurality of lamps arranged over a bottom cover; first and second lower structures mounted at opposite ends of the lamps, respectively; common electrodes mounted on the first and second lower structures respectively, each of the common electrodes having elevated flat portions between adjacent lamps; and first and second upper structures respectively coupled to the first and second lower structures, each of the first and second upper structures having a plurality of ribs, wherein each rib has a bent flat portion.

In another aspect of the present invention, the aforementioned and other advantages are achieved by a method of fabricating a backlight. The method comprises forming a first lower structure having a plurality of first grooves; attaching a first plurality of sound absorbing pads to the first lower structure, wherein each of the first plurality of sound absorbing pads is disposed in one of the first plurality of grooves; attaching a first plurality of common electrodes to the first lower structure, wherein the first plurality of sound absorbing pads are disposed between the first lower structure and the common electrodes; providing a plurality of lamps; attaching an end of each of the plurality of lamps to a corresponding common electrode within the first plurality of electrodes; and attaching a first upper structure having a first plurality of ribs to the first lower structure, wherein attaching the first upper structure includes pressing the first plurality of ribs against the first common electrodes and the first sound absorbing pads.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Figure 1:
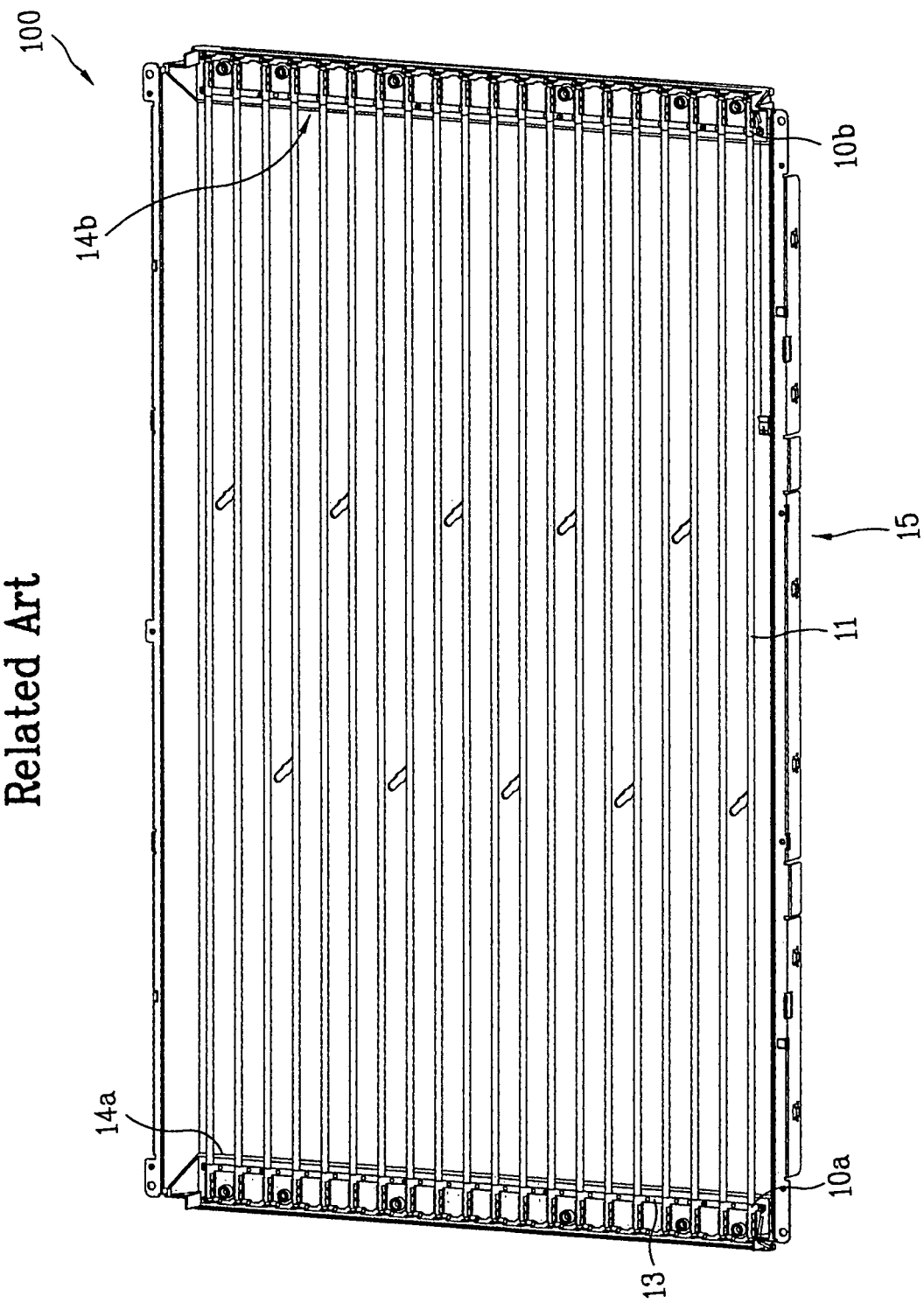
FIG. 1 is a perspective view illustrating a related art direct type backlight unit.
Figure 2:
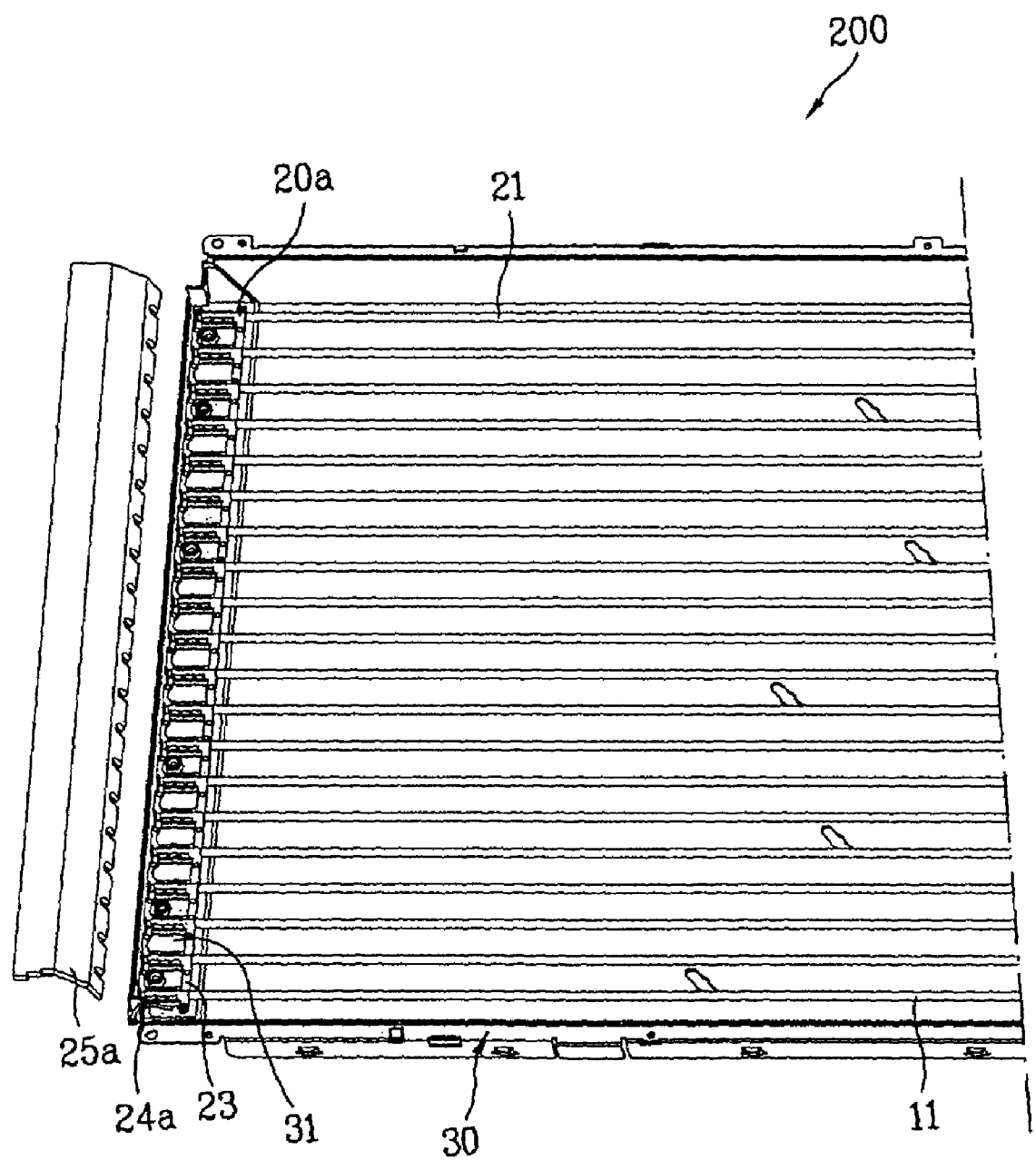
FIG. 2 is a partial perspective view illustrating a backlight unit.
Figure 3:
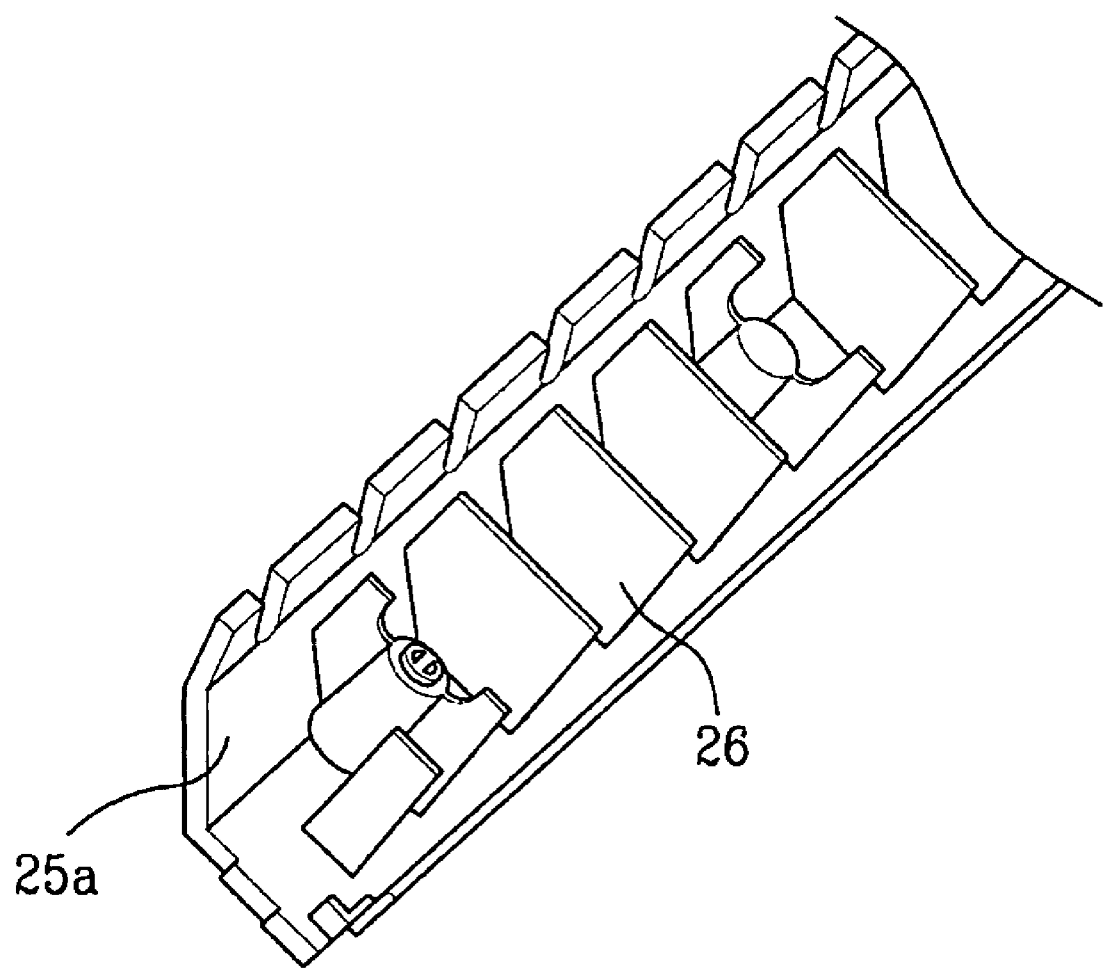
FIG. 3 is a partial perspective view illustrating an inside of the upper structure in FIG. 2.
Figure 4:
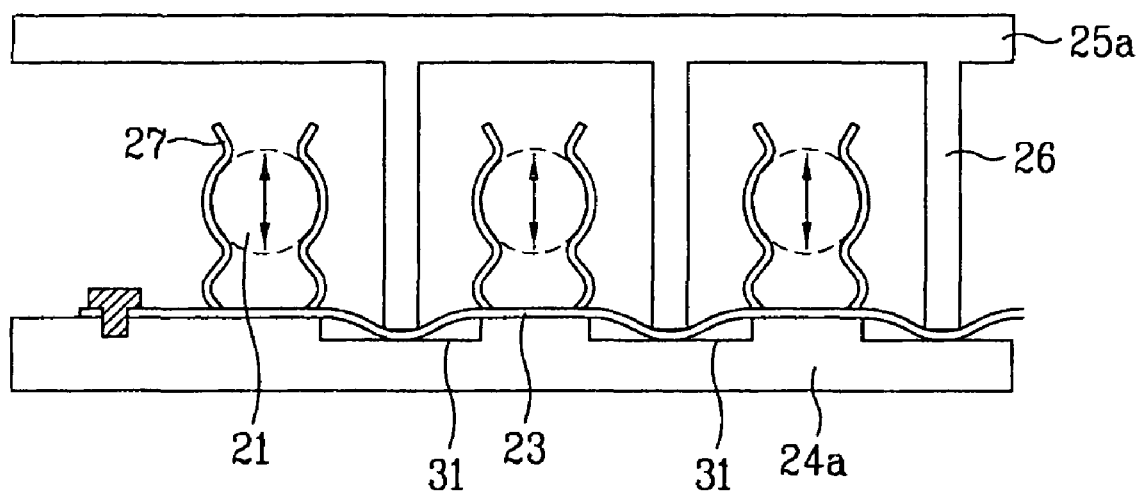
FIG. 4 is a sectional view illustrating a backlight unit.
Figure 5A:
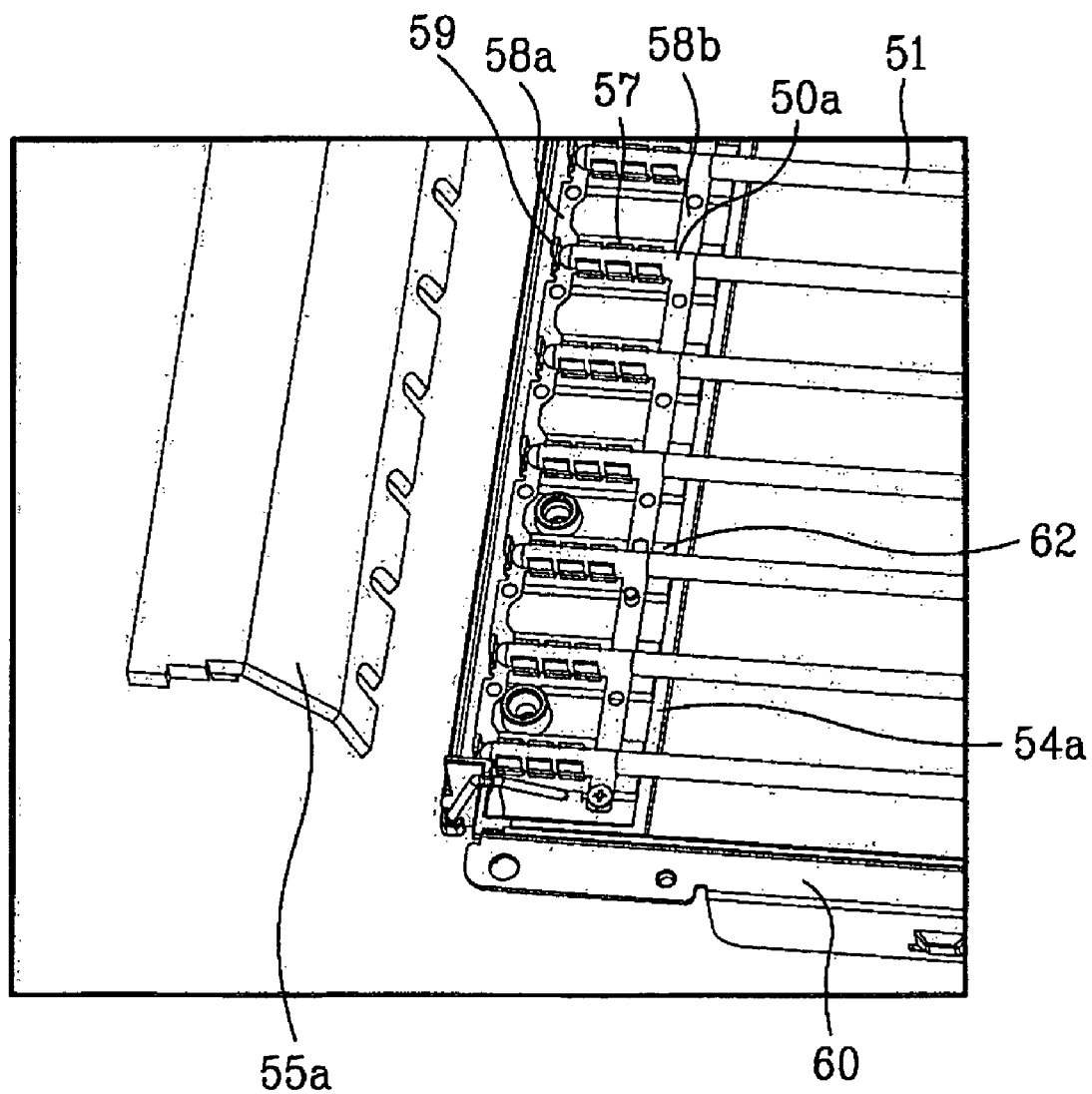
FIG. 5A and FIG. 5B are partial perspective views illustrating both ends of a backlight unit in accordance with a first embodiment of the present invention.
Figure 5B:
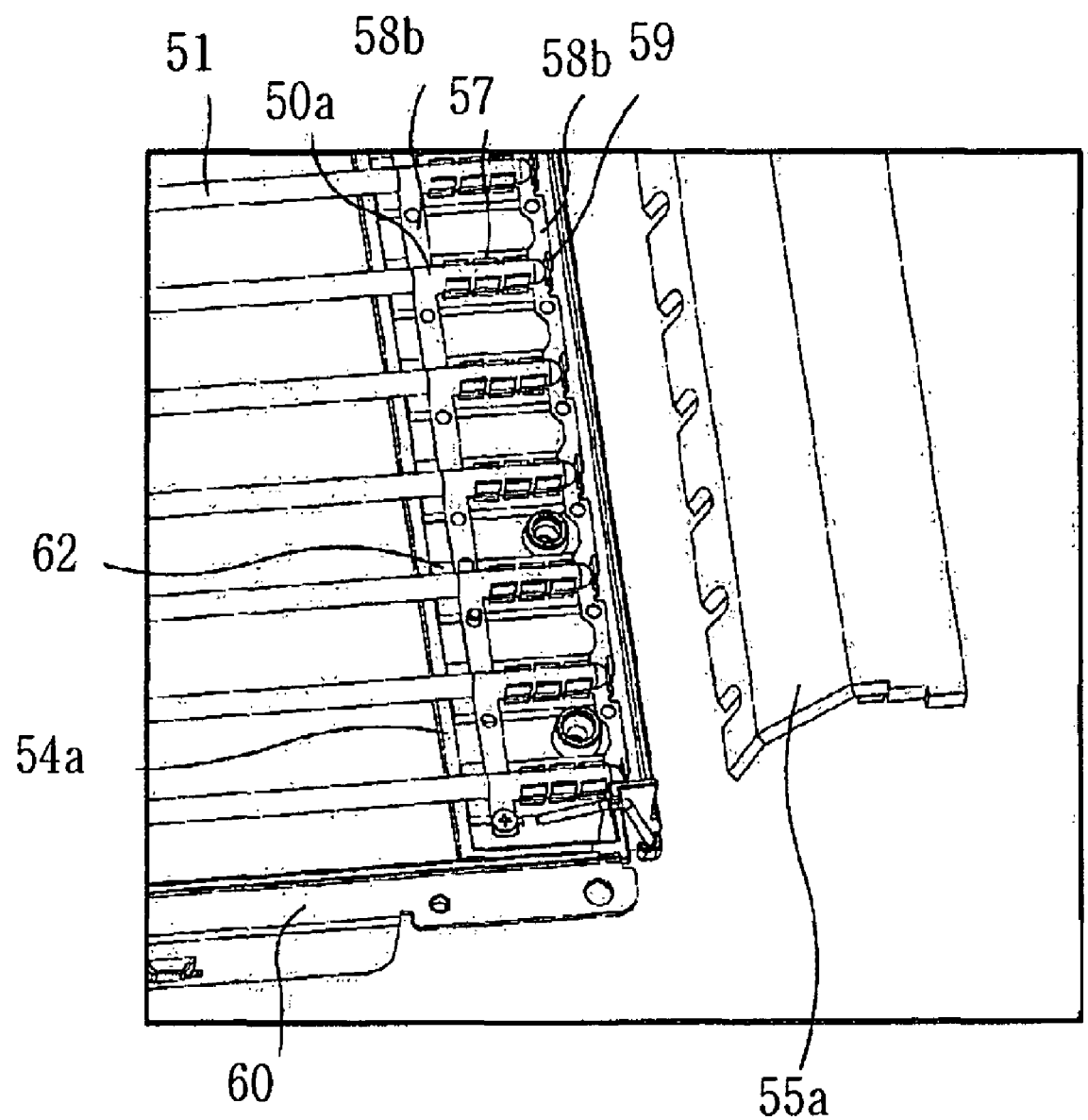
Figure 6:
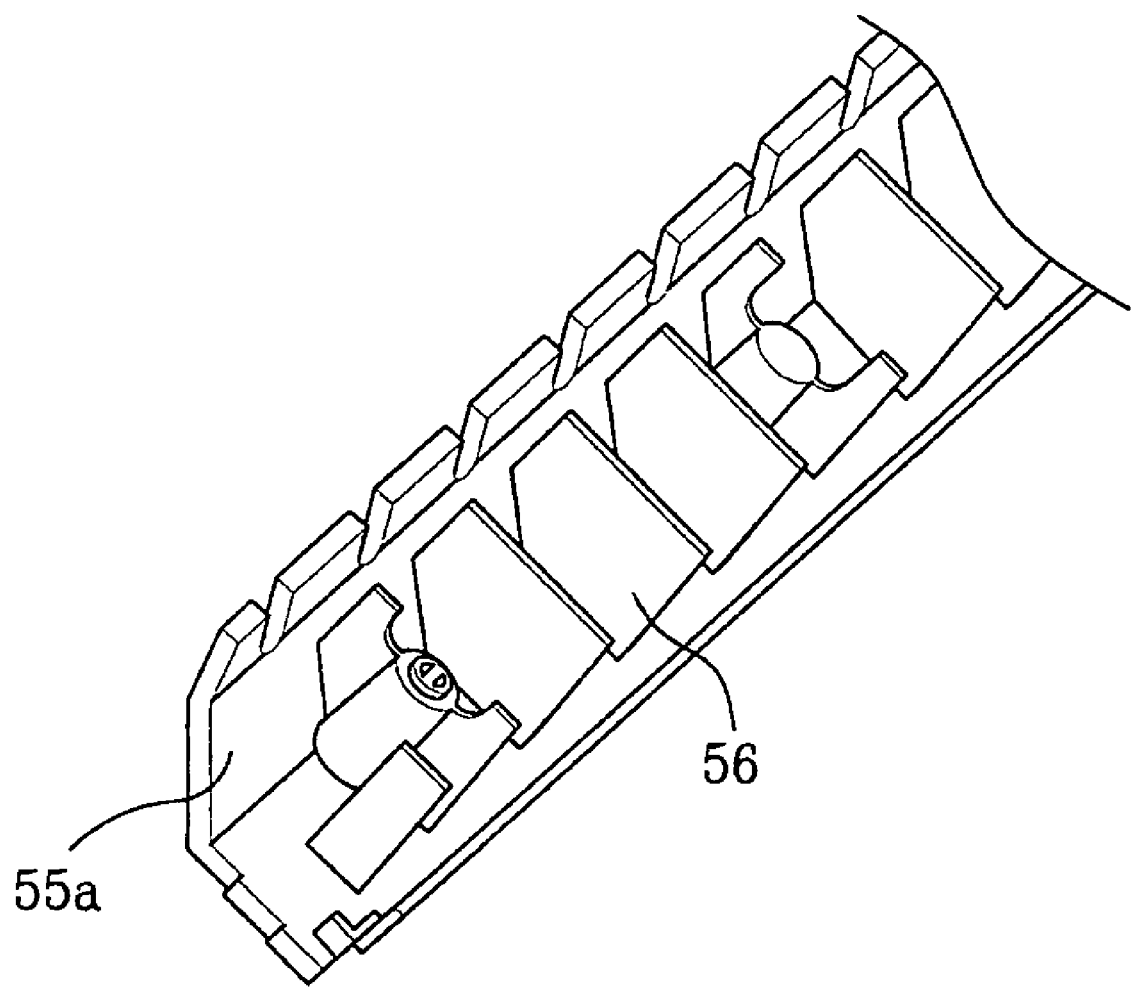
FIG. 6 is a partial perspective view illustrating an inside of the first or second upper structure in FIG. 5A and FIG. 5B.

Referring to FIGS. 2, 3, and 4, the backlight unit 200 includes a plurality of lamps 21 arranged over a bottom cover 30 at regular intervals, each with a first external electrode 20a and a second external electrode 20b (not shown) at opposite ends of a tube, and common electrodes 23 having gripper type fastening portions 27 for fixedly securing the lamps 21 respectively and applying a voltage to the first and second external electrodes at the opposite ends of the lamps 21. Backlight unit 200 further includes a first lower structure 24a and a second lower structure (not shown) arranged under the opposite ends of the lamps 21 for seating the common electrodes 23 at the ends of the lamps, and a first upper structure 25a and a second upper structure (not shown) having a plurality of ribs 26 for holding down the common electrodes 23 over the first, and second lower structures.

The first lower structure 24a and the second lower structure include a groove 31 between adjacent lamps 21. The common electrodes 23 are seated on the first lower structure 24a and the second lower structure at the opposite end of the lamps, and have the grooves 31 in one direction. Each of the ribs 26 inside of the first upper structure 25a and the second upper structure has a length greater than a distance between the upper and lower structures, and is formed opposite to the groove 31.

Referring to FIG. 4, upon coupling the first upper structure 25a and the second upper structure to the first lower structure 24a and the second lower structure, respectively, the ribs 26 of the first upper structure 25a and the second upper structure forcibly press down the common electrodes 23 in the grooves 31 of the first lower structure 24a and the second lower structure, thereby holding down the common electrodes 23. According to this, the common electrodes 23 are bent into the grooves 31.

Thus, the forcible pressing down of the common electrodes 23 with the ribs 26 of the inside of the first upper structure 25a and the second upper structure reduces vibration in the first and second lower structures and the common electrodes when power is applied for making dimming control.

Referring to FIGS. 5A, 5B, 6, and 7, the backlight unit 300 includes a plurality of lamps 51 arranged over a bottom cover 60 at regular intervals. Each lamp 51 has a first external electrode 50a and a second external electrode (not shown) at opposite ends of a tube. Common electrodes 53 have gripper type fastening portions 57 for fixedly securing the lamps 51 respectively and applying a voltage to the first external electrode 50a and the second external electrodes at the opposite ends of the lamps 51, a first lower structure 54a and a second lower structure (not shown) arranged under the opposite ends of the lamps 51 for seating the common electrodes 53, and a first upper structure 55a and a second upper structure (not shown) corresponding to the first lower structure 55a and the second lower structure (not shown).

There are grooves 61 in the first lower structure 54a and the second lower structure between adjacent lamps 51, and there are sound absorbing pads 62 on the first lower structure 54a and the second lower structure to substantially fill, or to partly fill, the grooves 61. The common electrodes 53 are seated on the sound absorbing pads 62 on the first lower structure 54a and the second lower structure in one direction.

There is a plurality of ribs 56 on an inner surface of the first upper structure 55a and the second upper structure formed opposite to the grooves 61 in the first lower structure 54a and the second lower structure. The ribs hold down the common electrodes 53 and the lamps 51, and each has a height greater than a distance between the first and second upper and lower structures.

Figure 7:
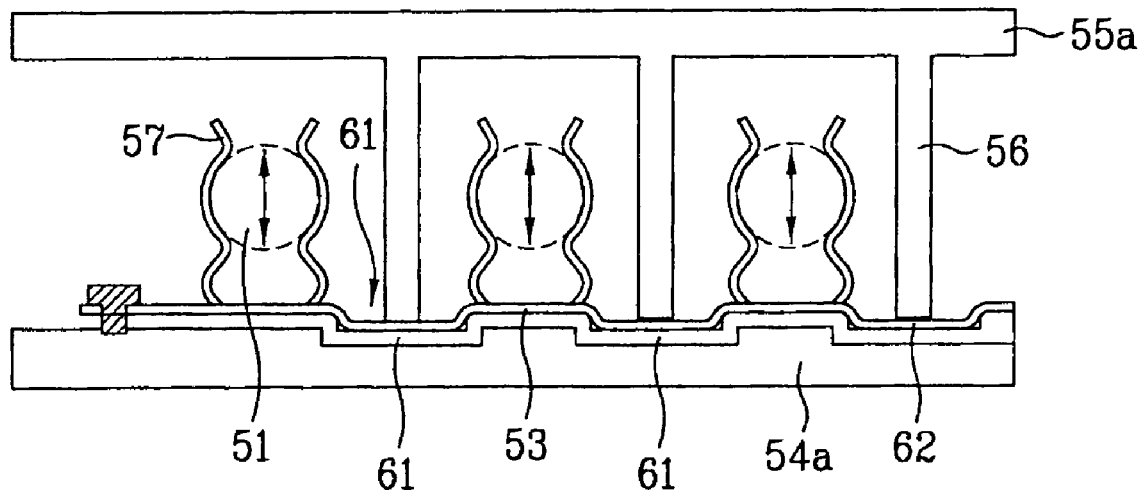
FIG. 7 is a sectional view illustrating a backlight unit in accordance with a first embodiment of the present invention.

Referring to FIG. 7, upon coupling the first and second upper structures to the first and second lower structures respectively, the ribs 56 of the first upper structure 55a and the second upper structure forcibly press down the common electrodes 53 on the sound absorbing pads 62 to hold down the common electrodes 53. Thus, with the sound absorbing pads 62 provided to the first and second lower structures, the sound absorbing pads 62 serve as a cushion even if the first and second structures press down the common electrodes 53 such that the common electrodes 53 are bent into the grooves 61. The sound absorbing pads 62 absorb vibration at the first and second lower structures and the common electrodes 53 when power is applied for dimming control.

The sound absorbing pads 62 may be constructed of a fire retarding class (e.g., UL94V2) because a high voltage is applied to the common electrodes 53. For example, the sound absorbing pads 62 may be silicone pads.

The common electrode 53 includes a plurality of fastening portions 57 spaced from each other, each having slits for holding the first or second external electrode at the ends of the lamp 51, first and second common electrode lines 58a and 58b on both sides of the fastening portions 57 for connecting the fastening portions 57, stoppers 59 positioned across an outer edge of an outer common electrode line where the end of the lamp 51 seats for left/right direction positioning of the lamp 51 when the lamp is mounted, and a plurality of holes formed in portions where screws are to be fastened for fixedly securing the common electrodes to the first and second lower structures. The fastening portion 57 is of a gripper type, which surrounds the lamp 51. The fastening portion 57 has two slits in the middle for mitigating poor contact with the lamp 51 due to manufacturing tolerances. The fastening portion 57 with slits may provide better contact than the fastening portion without the slits, thereby maximizing contact area with the lamp 51 to improve electric continuity/conductivity.

Though not shown, disposed over the lamps 51 are light scattering devices, such as diffusion sheets and diffusion plates, which scatter light from the lamps 51 to provide a uniform distribution of light on a display surface of the liquid crystal panel.

Figure 8:
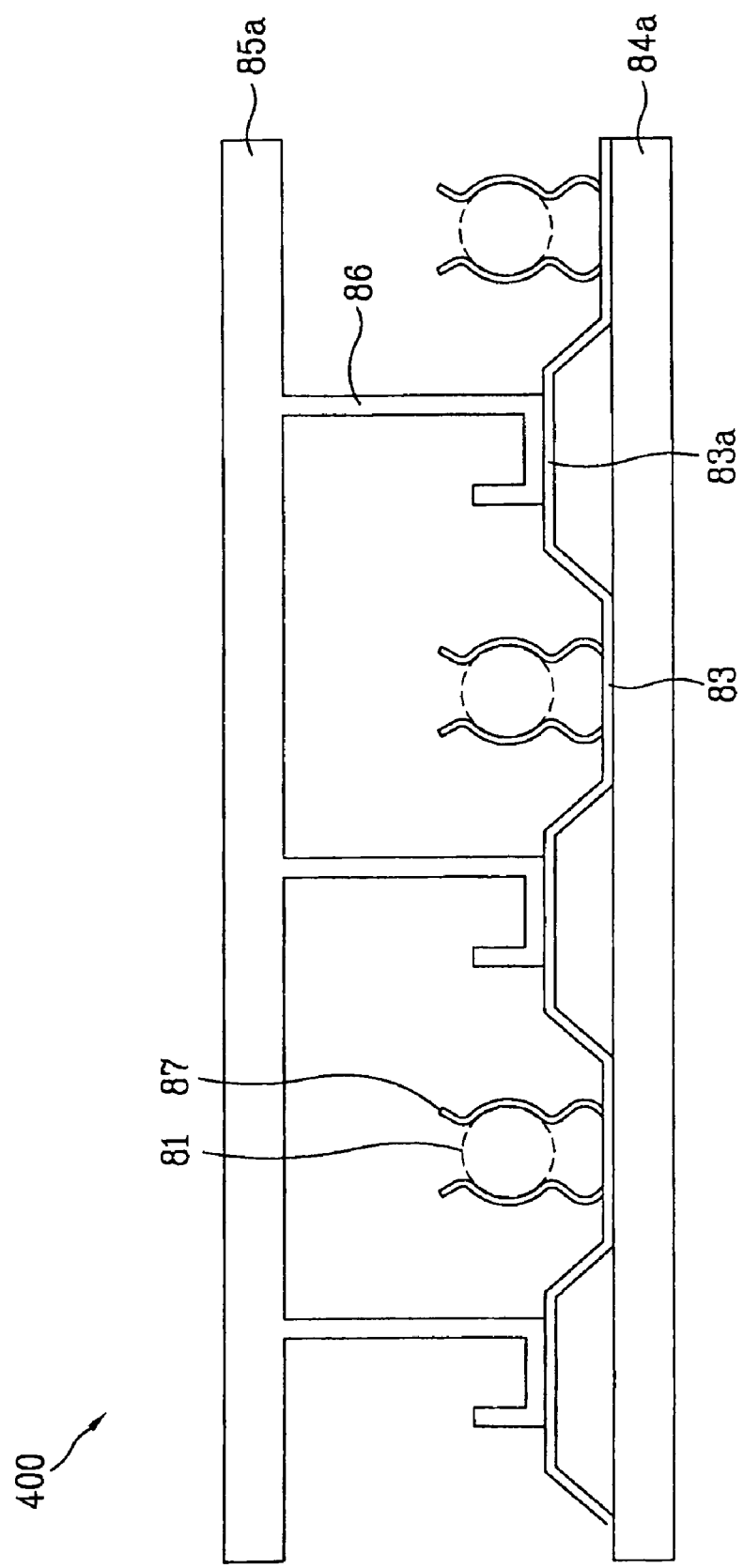
FIG. 8 is a sectional view illustrating a backlight unit in accordance with a second embodiment of the present invention.

FIG. 8 is a sectional view illustrating a backlight unit 800 in accordance with a second embodiment of the present invention.

Referring to FIG. 8, the backlight unit 800 includes a plurality of lamps 81 arranged over a bottom cover (not shown) at regular intervals, each with first and second external electrodes at opposite ends of a tube and common electrodes 83 having gripper type fastening portions 87 for fixedly securing the lamps 81 and applying a voltage to the first and second external electrodes at the opposite ends of the lamps 81. The backlight unit 800 further includes a first lower structure 84a and a second lower structure (not shown) arranged under the ends of the lamps 81 for seating the common electrodes 83, and a first upper structure 85a and a second upper structure (not shown) located above and in correspondence to the first lower structure 84a and the second lower structure.

Each of the common electrodes 83 mounted on the first lower structure 84a and the second lower structure has an elevated flat portion between adjacent lamps 81.

There is a plurality of ribs 86, each with a bent flat portion inside of the first upper structure 85a and the second upper structure such that the rib 86 at the bent flat portion abuts the elevated flat portion of the common electrodes for holding down the common electrodes 83. The rib 86 is provided with the bent flat portion for having a larger contact area with the common electrode 83 to better absorb vibration. The rib 86 has a height greater than a distance between the first and second upper structures and the elevated flat portions of the common electrodes 83.

Referring to FIG. 8, upon coupling the first and second upper structures to the first and second lower structures respectively, the bent flat portions of the ribs 86 of the first upper structure 85a and the second upper structure respectively forcibly press down the elevated flat portions of the common electrodes 83 to hold down the common electrodes 83.

Thus, if the elevated flat portions are provided to the common electrodes 83 between adjacent lamps 81, and the bent flat portions are provided to the first upper structure 85a and the second upper structure at positions opposite to the elevated flat portions of the common electrodes 83, the ribs 86 in contact with the bent flat portions of the common electrodes 83 will substantially absorb vibration of the first and second lower structures and the common electrodes 83 when for dimming control power is applied.

As has been described, the backlight unit of the present invention has the following advantages. By providing sound absorbing pads on grooves of the first and second lower structures, and/or providing bent flat portions to the ribs for pressing down the common electrodes, the humming noise can be reduced, which is caused by vibration that occurs when power for dimming control is applied to the backlight unit having externally mounted electrode lamps.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit comprising:
   a plurality of lamps;
   a first lower structure mounted at a first end of the lamps, the first lower structure having a first plurality of grooves, wherein each of the first plurality of grooves are disposed between the lamps;
   a first plurality of pads, wherein each of the first plurality of pads is disposed in one of the first plurality of grooves;
   a first plurality of common electrodes coupled to the first lower structure having the first plurality of pads disposed between the first plurality common electrodes and the first lower structure; and
   a first upper structure coupled to the first lower structure, wherein the first upper structure has a first plurality of ribs opposing the grooves, and
   wherein each of the plurality of ribs has a length greater than a distance between the first upper structure and the first lower structure where the lamps are disposed.

2. The backlight unit of claim 1, wherein each of the lamps is an external electrode lamp having first and second external electrodes at opposite ends of a tube.

3. The backlight unit of claim 1, wherein each of the first plurality of ribs contacts one of the first plurality of common electrodes such that the rib presses the common electrode against one of the pads.

4. The backlight unit of claim 1, wherein the first plurality of pads are of a fire retarding class.

5. The backlight unit of claim 1, wherein each of the first plurality of pads is a silicone pad.

6. The backlight unit of claim 1, wherein each of the first plurality of common electrodes includes:
   a plurality of gripper type fastening portions spaced from each other, each having slits for holding one of the lamps at the first end of the lamp;
   first and second common electrode lines on both sides of the fastening portions for connecting the fastening portions;
   a stopper positioned at an edge of each second common electrode line where the end of the lamp seats; and
   a plurality of holes formed in portions where screws are to be fastened for fixedly securing the first plurality of common electrodes to the first lower structure.

7. The backlight of claim 1, further comprising a second lower structure mounted at a second end of the lamps, wherein the second lower structure has a second plurality of grooves, and a second plurality of pads, wherein each of the second plurality of pads is disposed within one of the second plurality of grooves.

8. The backlight of claim 7, further comprising a second plurality of common electrodes coupled to the second lower structure having the second plurality of pads disposed between the second plurality common electrodes and the second lower structure.

9. The backlight unit of claim 1, further a comprising light scattering device positioned over the lamps, the light scattering device having a diffusion sheet and a diffusion plate for scattering a light from the lamps.

10. A backlight unit comprising:
    a plurality of lamps arranged over a bottom cover;
    first and second lower structures mounted at opposite ends of the lamps, respectively;
    common electrodes mounted on the first and second lower structures respectively, each of the common electrodes having elevated flat portions between adjacent lamps; and
    first and second upper structures respectively coupled to the first and second lower structures, each of the first and second upper structures having a plurality of ribs, wherein each rib has a bent portion, and
    wherein each of the bent portions is provided opposite to a corresponding elevated flat portion within the plurality of elevated flat portions and each of the plurality of ribs has a length greater than a distance between surfaces of the first and second upper structures and the elevated flat portions of the common electrodes.

11. The backlight unit of claim 10, wherein the bent portion of the rib is in contact with the elevated flat portion of the common electrode.

12. The backlight unit of claim 10, wherein each of the lamps is an external electrode lamp having first and second external electrodes at opposite ends of a tube.

13. The backlight unit of claim 10, wherein the common electrode includes:
    a plurality of gripper type fastening portions spaced from each other, each having slits for holding one of opposite ends of the lamp;
    first and second common electrode lines on both sides of the fastening portions for connecting the fastening portions;
    a plurality of stoppers, each of which at an edge of the second common electrode line where the end of the lamp seats for left/right direction positioning of the lamp at the time the lamp is mounted; and
    a plurality of holes formed in portions where screws are to be fastened for fixedly securing the common electrodes to the first and second lower structures.

14. The backlight unit of claim 10, further comprising a light scattering device positioned over the lamps, the light scattering device having diffusion a sheet and a diffusion plate for scattering a light from the lamps.

15. A method of fabricating a backlight, comprising:
    forming a first lower structure having a plurality of first grooves;
    attaching a first plurality of pads to the first lower structure, wherein each of the first plurality of pads is disposed in one of the first plurality of grooves;
    attaching a first plurality of common electrodes to the first lower structure, wherein the first plurality of pads are disposed between the first lower structure and the common electrodes;
    providing a plurality of lamps;
    attaching an end of each of the plurality of lamps to a corresponding common electrode within the first plurality of electrodes; and
    attaching a first upper structure having a first plurality of ribs to the first lower structure, wherein attaching the first upper structure includes pressing the first plurality of ribs against the first common electrodes and the first pads above the grooves, and
    wherein each of the plurality of ribs has a length greater than a distance between the first upper structure and the first lower structure where the lamps are disposed.

16. The method of claim 15, further comprising:
    forming a second lower structure having a second plurality of grooves;
    attaching a second plurality of pads to the second lower structure, wherein each of the second plurality of pads is disposed in one of the second plurality of grooves;
    attaching a second plurality of common electrodes to the second lower structure, wherein the second plurality of pads are disposed between the second lower structure and the common electrodes;
    attaching an opposite end of each of the plurality of lamps to one of the second plurality of electrodes; and
    attaching a second upper structure having a second plurality of ribs to the second lower structure, wherein attaching the second upper structure includes pressing the second plurality of ribs against the second common electrodes and the second pads.

17. The method of claim 15, wherein attaching the first plurality of common electrodes includes:
    forming a plurality of gripper type fastening portions spaced from each other, each having slits for holding one of the lamps at the first end of the lamp;
    forming first and second common electrode lines on both sides of the fastening portions for connecting the fastening portions;
    attaching a stopper positioned at an edge of each second common electrode line where the end of the lamp seats; and
    forming a plurality of holes formed in portions where screws are to be fastened for fixedly securing the first plurality of common electrodes to the first lower structure.

* * * * *